United States Patent
Uchikawa

(10) Patent No.: US 9,591,674 B2
(45) Date of Patent: Mar. 7, 2017

(54) COMMUNICATION APPARATUS AND CONTROL METHOD THEREOF

(71) Applicant: CANON KABUSHIKI KAISHA, Tokyo (JP)

(72) Inventor: Shinichi Uchikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 13/886,411

(22) Filed: May 3, 2013

(65) Prior Publication Data

US 2014/0006633 A1 Jan. 2, 2014

(30) Foreign Application Priority Data

Jun. 29, 2012 (JP) ................................. 2012-147598

(51) Int. Cl.
*G06F 15/16* (2006.01)
*H04W 76/02* (2009.01)
*H04W 48/20* (2009.01)
*H04W 48/16* (2009.01)

(52) U.S. Cl.
CPC ........... *H04W 76/02* (2013.01); *H04W 48/20* (2013.01); *H04W 48/16* (2013.01)

(58) Field of Classification Search
CPC ...... H04W 76/02; H04W 48/20; H04W 48/16
See application file for complete search history.

(56) References Cited

U.S. PATENT DOCUMENTS

| | | | |
|---|---|---|---|
| 5,598,536 A * | 1/1997 | Slaughter et al. | 709/219 |
| 6,594,708 B1 * | 7/2003 | Slaughter et al. | 719/315 |
| 6,618,767 B1 * | 9/2003 | Slaughter et al. | 719/321 |
| 7,292,585 B1 * | 11/2007 | Slaughter et al. | 370/400 |
| 7,680,950 B1 * | 3/2010 | Slaughter et al. | 709/238 |

(Continued)

FOREIGN PATENT DOCUMENTS

| | | |
|---|---|---|
| JP | 2004-193775 A | 7/2004 |
| JP | 2009-521190 A | 5/2009 |
| WO | 2007/075961 A | 7/2007 |

OTHER PUBLICATIONS

Japanese Office Action issued in corresponding application No. 2012147598 on Mar. 4, 2016.

*Primary Examiner* — Ario Etienne
*Assistant Examiner* — Andrea Hurst
(74) *Attorney, Agent, or Firm* — Carter, DeLuca, Farrell & Schmidt LLP

(57) ABSTRACT

A mobile terminal communicable with a service providing apparatus via an access point, comprises: an access unit configured to access a designated access point by wireless connection; a receiving unit configured to switch, if a service search instruction is received, the wireless connection with the designated access point by the access unit to wirelessly connect to another access point, and receive information of a service provided by a service providing apparatus communicable via the other access point; and a display unit configured to display a selection screen for enabling to select, based on the received information, between a service provided by a service providing apparatus communicable via the designated access point and a service provided by a service providing apparatus communicable via the other access point.

16 Claims, 11 Drawing Sheets

(56) References Cited

U.S. PATENT DOCUMENTS

| | | | |
|---|---|---|---|
| 7,689,715 B1* | 3/2010 | Slaughter et al. | 709/245 |
| 7,764,681 B2* | 7/2010 | Slaughter et al. | 370/389 |
| 7,899,934 B2* | 3/2011 | Slaughter et al. | 709/245 |
| 8,135,796 B1* | 3/2012 | Slaughter et al. | 709/217 |
| 8,161,397 B2* | 4/2012 | Kalasapur et al. | 715/757 |
| 8,185,165 B2* | 5/2012 | Beninghaus et al. | 455/574 |
| 8,189,225 B1* | 5/2012 | Lo | G06F 3/122 358/1.15 |
| 8,275,864 B1* | 9/2012 | Slaughter et al. | 709/223 |
| 8,370,523 B1* | 2/2013 | Slaughter et al. | 709/240 |
| 8,499,079 B2* | 7/2013 | Giles | H04W 8/183 709/220 |
| 8,526,046 B2* | 9/2013 | Uchida | H04L 69/08 358/1.13 |
| 8,526,350 B2* | 9/2013 | Xue et al. | 370/312 |
| 8,610,927 B2* | 12/2013 | Sweet | G06F 3/1204 358/1.13 |
| 8,610,928 B2* | 12/2013 | Sweet | G06F 3/1204 358/1.13 |
| 8,718,837 B2* | 5/2014 | Wang et al. | 701/2 |
| 8,761,723 B2* | 6/2014 | Shim | H04W 24/02 455/405 |
| 8,830,866 B2* | 9/2014 | Bradley | H04W 48/16 370/254 |
| 8,856,638 B2* | 10/2014 | Evans | 715/206 |
| 8,862,128 B2* | 10/2014 | Hwang | H04W 4/001 455/418 |
| 8,862,978 B2* | 10/2014 | Evans | 715/206 |
| 8,867,514 B2* | 10/2014 | Abraham | H04L 67/16 370/338 |
| 8,904,271 B2* | 12/2014 | Evans | 715/206 |
| 8,918,145 B2* | 12/2014 | Ashrafi | 455/558 |
| 8,922,813 B2* | 12/2014 | Busch | G06F 3/1206 358/1.15 |
| 8,964,961 B2* | 2/2015 | Keller | H04W 76/02 379/265.05 |
| 9,185,644 B2* | 11/2015 | Mizutani | H04W 36/0083 |
| 2002/0097424 A1* | 7/2002 | Ferlitsch | G06F 3/1212 358/1.15 |
| 2002/0120750 A1* | 8/2002 | Nidd | H04L 67/16 709/227 |
| 2004/0087274 A1* | 5/2004 | Ekberg | H04W 48/16 455/41.2 |
| 2005/0004968 A1* | 1/2005 | Mononen | H04L 63/0823 709/200 |
| 2005/0097087 A1* | 5/2005 | Punaganti Venkata et al. | 707/3 |
| 2005/0138630 A1* | 6/2005 | Reynolds | G06F 3/0346 719/310 |
| 2005/0155070 A1* | 7/2005 | Slaughter | 725/86 |
| 2006/0077421 A1* | 4/2006 | Eden et al. | 358/1.15 |
| 2006/0098588 A1* | 5/2006 | Zhang | H04L 67/104 370/255 |
| 2006/0178917 A1* | 8/2006 | Merriam et al. | 705/7 |
| 2007/0124453 A1* | 5/2007 | Slaughter et al. | 709/223 |
| 2007/0237153 A1* | 10/2007 | Slaughter et al. | 370/392 |
| 2008/0253304 A1* | 10/2008 | Torabi | 370/254 |
| 2009/0252102 A1* | 10/2009 | Seidel et al. | 370/329 |
| 2009/0252134 A1* | 10/2009 | Schlicht et al. | 370/338 |
| 2009/0319663 A1* | 12/2009 | Giles | H04W 8/183 709/226 |
| 2010/0093355 A1* | 4/2010 | Voyer | H04W 36/04 455/436 |
| 2010/0142448 A1* | 6/2010 | Schlicht et al. | 370/328 |
| 2010/0201996 A1* | 8/2010 | Chang | G06F 3/1245 358/1.2 |
| 2011/0082939 A1* | 4/2011 | Montemurro et al. | 709/227 |
| 2011/0082940 A1* | 4/2011 | Montemurro et al. | 709/227 |
| 2011/0194123 A1* | 8/2011 | Sweet | G06F 3/1204 358/1.2 |
| 2011/0194124 A1* | 8/2011 | Sweet | G06F 3/1204 358/1.2 |
| 2011/0194140 A1* | 8/2011 | Sweet | G06F 3/1204 358/1.15 |
| 2011/0194141 A1* | 8/2011 | Sweet | G06F 3/1204 358/1.15 |
| 2011/0211219 A1* | 9/2011 | Bradley | G06F 3/12 358/1.15 |
| 2011/0294474 A1* | 12/2011 | Barany et al. | 455/414.1 |
| 2012/0075664 A1* | 3/2012 | Nichols | G06F 3/1204 358/1.15 |
| 2012/0084364 A1* | 4/2012 | Sivavakeesar | 709/205 |
| 2012/0106428 A1* | 5/2012 | Schlicht et al. | 370/312 |
| 2012/0164972 A1* | 6/2012 | Shim | H04W 24/02 455/405 |
| 2012/0197464 A1* | 8/2012 | Wang et al. | 701/2 |
| 2012/0209705 A1* | 8/2012 | Ramer et al. | 705/14.51 |
| 2012/0209706 A1* | 8/2012 | Ramer et al. | 705/14.51 |
| 2012/0209707 A1* | 8/2012 | Ramer et al. | 705/14.51 |
| 2012/0209708 A1* | 8/2012 | Ramer et al. | 705/14.51 |
| 2012/0209709 A1* | 8/2012 | Ramer et al. | 705/14.51 |
| 2012/0209710 A1* | 8/2012 | Ramer et al. | 705/14.51 |
| 2012/0215602 A1* | 8/2012 | Ramer et al. | 705/14.13 |
| 2012/0215612 A1* | 8/2012 | Ramer et al. | 705/14.23 |
| 2012/0215622 A1* | 8/2012 | Ramer et al. | 705/14.44 |
| 2012/0215623 A1* | 8/2012 | Ramer et al. | 705/14.44 |
| 2012/0215624 A1* | 8/2012 | Ramer et al. | 705/14.44 |
| 2012/0215625 A1* | 8/2012 | Ramer et al. | 705/14.44 |
| 2012/0215626 A1* | 8/2012 | Ramer et al. | 705/14.44 |
| 2012/0215635 A1* | 8/2012 | Ramer et al. | 705/14.51 |
| 2012/0215639 A1* | 8/2012 | Ramer et al. | 705/14.53 |
| 2012/0215640 A1* | 8/2012 | Ramer et al. | 705/14.55 |
| 2012/0274979 A1* | 11/2012 | Uchida | H04L 69/08 358/1.15 |
| 2012/0287460 A1* | 11/2012 | McMillin | H04N 1/00204 358/1.15 |
| 2013/0016392 A1* | 1/2013 | Lee | 358/1.15 |
| 2013/0100487 A1* | 4/2013 | Busch | G06F 3/1206 358/1.15 |
| 2013/0191518 A1* | 7/2013 | Narayanan | H04W 8/18 709/220 |
| 2013/0222837 A1* | 8/2013 | Watanabe | G06F 3/1222 358/1.14 |
| 2013/0268406 A1* | 10/2013 | Radhakrishnan et al. | 705/26.61 |
| 2013/0315106 A1* | 11/2013 | Anulf et al. | 370/259 |
| 2013/0316651 A1* | 11/2013 | Giles | H04W 8/183 455/41.2 |
| 2014/0087854 A1* | 3/2014 | Evans | 463/25 |
| 2014/0089413 A1* | 3/2014 | Evans | 709/204 |
| 2014/0089798 A1* | 3/2014 | Evans | 715/716 |
| 2014/0089799 A1* | 3/2014 | Evans | 715/716 |
| 2014/0207286 A1* | 7/2014 | Wang et al. | 700/259 |
| 2014/0256320 A1* | 9/2014 | Ashrafi | 455/435.1 |
| 2014/0348025 A1* | 11/2014 | Abraham et al. | 370/254 |
| 2014/0351435 A1* | 11/2014 | Abraham et al. | 709/225 |
| 2015/0022842 A1* | 1/2015 | Busch | G06F 3/1206 358/1.13 |
| 2015/0201443 A1* | 7/2015 | Emani | H04W 76/023 370/338 |
| 2015/0245243 A1* | 8/2015 | Wentink | H04W 28/042 370/235 |
| 2015/0245244 A1* | 8/2015 | Wentink | H04W 28/042 370/235 |
| 2016/0037333 A1* | 2/2016 | Amundsen | H04M 1/72577 455/419 |
| 2016/0066354 A1* | 3/2016 | Oba | H04W 4/08 370/392 |
| 2016/0227544 A1* | 8/2016 | Katar | H04W 48/16 |

* cited by examiner

FIG. 8A
AP MANAGEMENT TABLE 801

| AP | AUTHENTICATION | AUTHENTICATION INFORMATION | RECEPTION | CONNECTION STATUS |
|---|---|---|---|---|
| 3G Network | NECESSARY | REGISTERED | WITHIN COMMUNICATION RANGE (STRONG) | CURRENTLY CONNECTED |
| Wifi AP1 | NECESSARY | REGISTERED | WITHIN COMMUNICATION RANGE (STRONG) | UNCONNECTED |
| Wifi AP2 | NOT NECESSARY | UNREGISTERED | WITHIN COMMUNICATION RANGE (WEAK) | UNCONNECTED |
| Wifi AP3 | NECESSARY | UNREGISTERED | WITHIN COMMUNICATION RANGE (STRONG) | UNCONNECTED |
| Wifi AP4 | NECESSARY | REGISTERED | OUTSIDE COMMUNICATION RANGE | UNCONNECTED |

FIG. 8B
SERVICE SEARCH AP LIST 802

| AP | SEARCH STATUS |
|---|---|
| 3G Network | SEARCHED |
| Wifi AP1 | UNSEARCHED |
| Wifi AP2 | UNSEARCHED |

FIG. 8C
SERVICE SEARCH RESULT LIST 803

| PRINTER NAME | IP ADDRESS | GeoLocation | AP |
|---|---|---|---|
| PrinterA | 172.24.177.1 | LATITUDE: 35° 34' 32.668"  LONGITUDE: 139° 39' 34.79" | Wifi AP1 |
| PrinterB | 172.24.177.2 | LATITUDE: 35° 34' 52.154"  LONGITUDE: 139° 38' 29.306" | Wifi AP1 |
| PrinterC | 172.24.177.1 | LATITUDE: 35° 34' 45.181"  LONGITUDE: 139° 39' 2.336" | Wifi AP2 |

F I G. 11

SERVICE HISTORY                                    1101

| SERVICE NAME | AP | IP ADDRESS | LAST USE DATE/TIME |
|---|---|---|---|
| PrinterA | Wifi AP1 | 172.24.177.1 | 2012/3/3 19:00 |
| PrinterB | Wifi AP2 | 172.24.177.2 | 2012/3/25 12:00 |
| PrinterC | Wifi AP3 | 172.24.177.1 | 2012/5/3 14:00 | ern
COMMUNICATION APPARATUS AND CONTROL METHOD THEREOF

BACKGROUND OF THE INVENTION

Field of the Invention

The present invention relates to a mobile terminal, a service search method, and a non-transitory computer-readable medium and, more particularly, to a technique of searching for a service on a network from a mobile terminal connectable to the Internet or an intranet.

Description of the Related Art

When the user searches for a service provided on a network using a mobile terminal, it is conventionally possible to search for a desired network service using a network service search protocol (mDNS (Multicast DNS), WS-Discovery (Web Services Discovery), SSDP (Simple Service Discovery Protocol), SLP (Service-Location Protocol), or the like). Since such a service search protocol adopts a multicast technique, it is also possible to search for a service on a different network adjacent to a connected network.

As another service search means, there is provided a technique in which if a wireless LAN access point itself provides a service, the service is opened to the public as access point information, and the information is obtained to identify the service (see Japanese Patent Laid-Open No. 2009-521190).

Although using such a network service search protocol technique enables to search for a service on an adjacent network, this is limited to networks in which multicast communication is possible. It is, therefore, impossible to search for a service provided on a separated network or a network in which multicast communication between networks is interrupted.

Consider, for example, a case in which there is a printer on a network created by a WiFi Direct compatible terminal (to be referred to as a WiFi Direct terminal hereinafter). In this case, if the user terminal searches for a print service while connecting to a network other than a WiFi Direct network, it cannot find a print service connected to the WiFi Direct terminal. In addition to the WiFi Direct network, the same problem arises when the user terminal is connected to a network which cannot perform multicast communication with a network where a printer is set up.

Assume that a network connected with a printer which the user wants to use is different from that connected with a mobile terminal. In this case, even if the user attempts to physically specify the printer to detect a print service, it may be impossible to detect the print service.

To solve this problem, the user may manually switch the network connected with the user terminal for each service search, thereby searching for services on all networks. This method, however, complicates the user operation, which is cumbersome. Furthermore, the search result of a search in each network is individually displayed. Consequently, it is impossible to collectively check the service search results, and thus it is difficult to determine a service to be used by comparing the respective search results with each other.

SUMMARY OF THE INVENTION

According to one aspect of the present invention, there is provided a mobile terminal communicable with a service providing apparatus via an access point, comprising: an access unit configured to access a designated access point by wireless connection; a receiving unit configured to switch, if a service search instruction is received, the wireless connection with the designated access point by the access unit to wirelessly connect to another access point, and receive information of a service provided by a service providing apparatus communicable via the other access point; and a display unit configured to display a selection screen for enabling to select, based on the received information, between a service provided by a service providing apparatus communicable via the designated access point and a service provided by a service providing apparatus communicable via the other access point.

According to another aspect of the present invention, there is provided a service search method for a mobile terminal communicable with a service providing apparatus via an access point, comprising: accessing a designated access point by wireless connection; switching, if a service search instruction is received, the wireless connection with the designated access point in the accessing step to wirelessly connect to another access point, and receiving information of a service provided by a service providing apparatus communicable via the other access point; and displaying a selection screen for enabling to select, based on the received information, between a service provided by a service providing apparatus communicable via the designated access point and a service provided by a service providing apparatus communicable via the other access point.

According to another aspect of the present invention, there is provided a non-transitory computer-readable medium storing a program for causing a computer to function as an access unit configured to access a designated access point by wireless connection; a receiving unit configured to switch, if a service search instruction is received, the wireless connection with the designated access point by the access unit to wirelessly connect to another access point, and receive information of a service provided by a service providing apparatus communicable via the other access point; and a display unit configured to display a selection screen for enabling to select, based on the received information, between a service provided by a service providing apparatus communicable via the designated access point and a service provided by a service providing apparatus communicable via the other access point.

According to the present invention, if a mobile terminal connectable to a plurality of networks searches for a service on a network, it is possible to reliably discover a desired service by performing a service search for each connectable network.

Further features of the present invention will become apparent from the following description of exemplary embodiments (with reference to the attached drawings).

BRIEF DESCRIPTION OF THE DRAWINGS

FIGS. 8A, 8B, and 8C are tables showing examples of various data;

FIG. 11 is a table showing an example of service history information.

DESCRIPTION OF THE EMBODIMENTS

A mode for carrying out the present invention will be described below with reference to the accompanying drawings.

[System Configuration]

Figure 2:
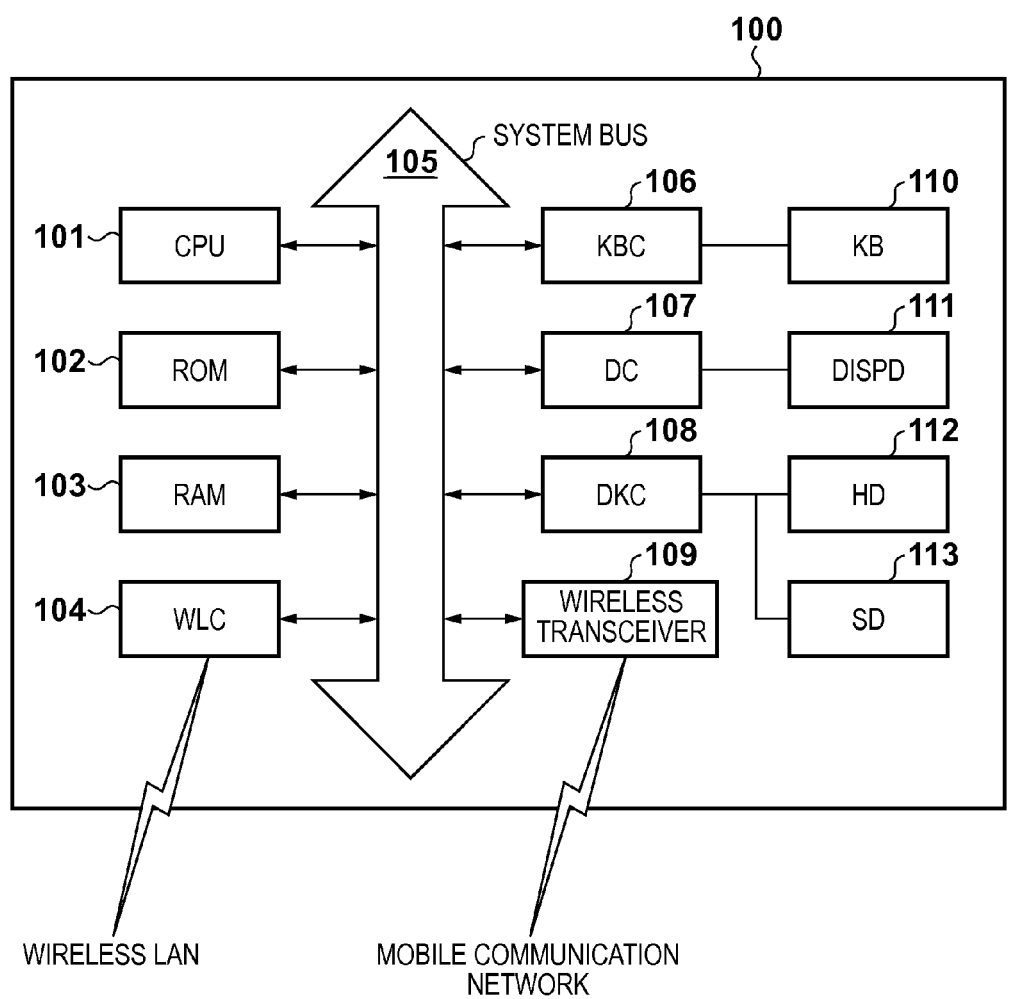
FIG. 2 is a block diagram showing an example of a hardware configuration.

An example of the overall configuration of a system according to an embodiment and a case in which a mobile terminal searches for a service on a network will be explained. A mobile terminal 100 as a mobile terminal according to the embodiment is, for example, a smartphone, a mobile phone, or an information processing apparatus having a function of enabling wireless connection, and has the same configuration as that of a general PC (Personal Computer). FIG. 2 shows an example of the hardware configuration of the mobile terminal 100 according to the present invention. That is, the mobile terminal 100 includes a CPU 101, a ROM 102, a RAM 103, a wireless LAN card (WLC) 104, a keyboard controller (KBC) 106, a display controller (DC) 107, a disk controller (DKC) 108, and a wireless transceiver 109. These components are communicably connected with each other via a system bus 105.

The CPU 101 executes various software programs stored in the ROM 102 or an HD 112, or supplied from an external memory (SD) 113 such as an SD card. The CPU 101 collectively controls the respective components connected to the system bus 105.

The RAM 103 functions as a main memory, a work area, or the like for the CPU 101. The KBC 106 controls instruction inputs from a KB 110, a pointing device (not shown), or the like. The DC 107 controls display of a display (DISP) 111.

The DKC 108 controls access to the HD 112 and SD 113. The HD 112 or SD 113 stores a boot program, a distributed server system program, various applications, edit files, user files, and the like. The wireless transceiver 109 serves as a device for communicating with the Internet via a mobile communication network such as a 3G/4G (W-CDMA (Wideband Code Division Multiple Access) or LTE (Long Term Evolution)) mobile network.

The WLC 104 serves as a device for bidirectionally exchanging data with a network printer, another network device, or an information processing apparatus via a wireless LAN. The CPU 101 controls the wireless transceiver 109 and WLC 104 to perform communication via an arbitrary communication line.

Figure 3:
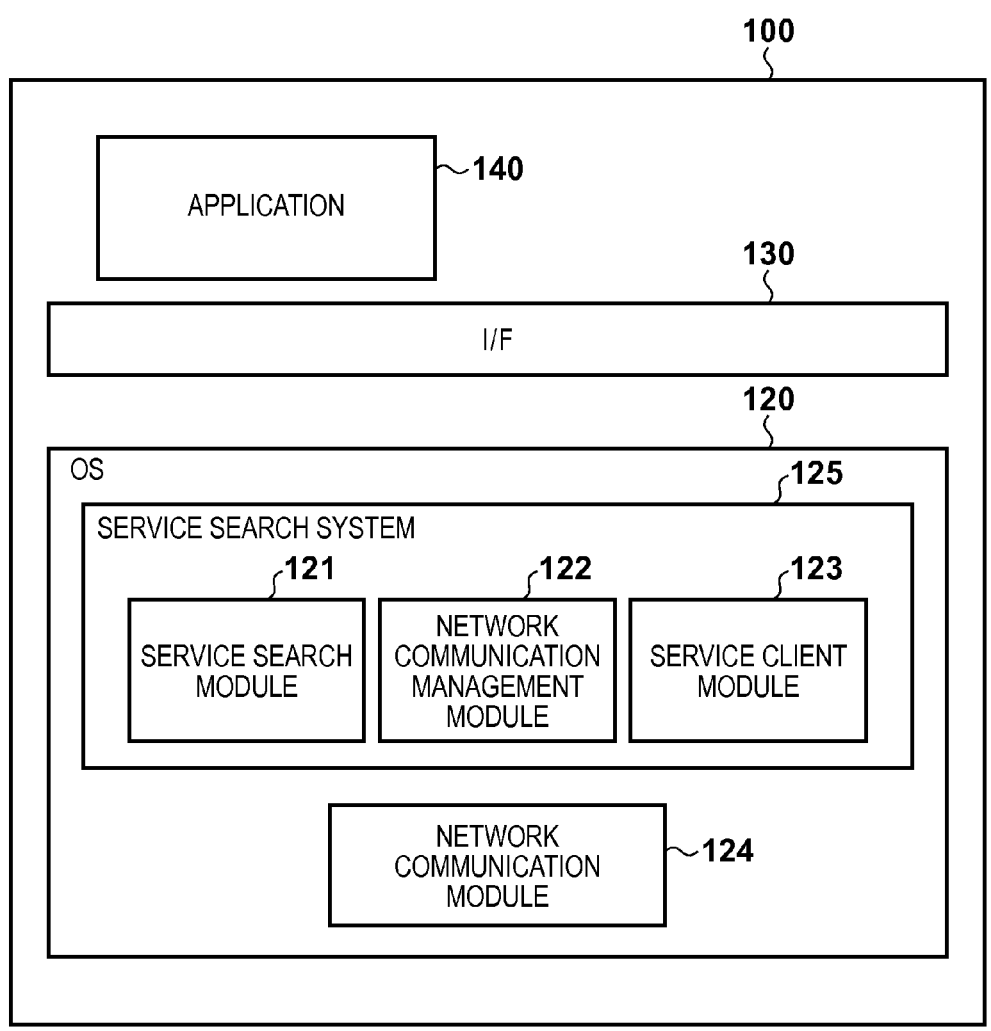
FIG. 3 is a block diagram showing an example of the software configuration of a mobile terminal.

FIG. 3 shows an example of the internal configuration of the mobile terminal 100. The mobile terminal 100 mainly includes an application 140 operating within the mobile terminal, a service search system 125, and an OS 120 of the mobile terminal. These modules are recorded in one of the ROM 102, HD 112, and SD 113 of the mobile terminal 100, and executed by the CPU 101.

The application 140 has a function of processing a document, an electronic book reader, or a game function, and can be added later by the user. The application 140 can use, via an I/F 130, a service (function) provided by the OS 120. The OS 120 provides a function of operating the hardware of the mobile terminal 100, a function of connecting to a wireless LAN or a mobile base station 202 to perform communication, a function of performing a network service search for the application 140, and the like. The service search system 125 has a function of searching for a service designated by the application 140 on a network.

A network communication management module 122 manages connection of a network to undergo a service search. More specifically, the network communication management module 122 manages currently connectable access points (to be referred to as APs hereinafter), and determines and switches a connection destination. In this embodiment, the AP indicates the access point of a wireless LAN including a wireless router for connecting terminals with each other and a base station for connecting to a mobile phone and the Internet. A service search module 121 is a module for providing a search function supporting various service search protocols. For example, mDNS, WS-Discovery, SSDP, and SLP protocols are supported.

[Service Search]

Figure 1:
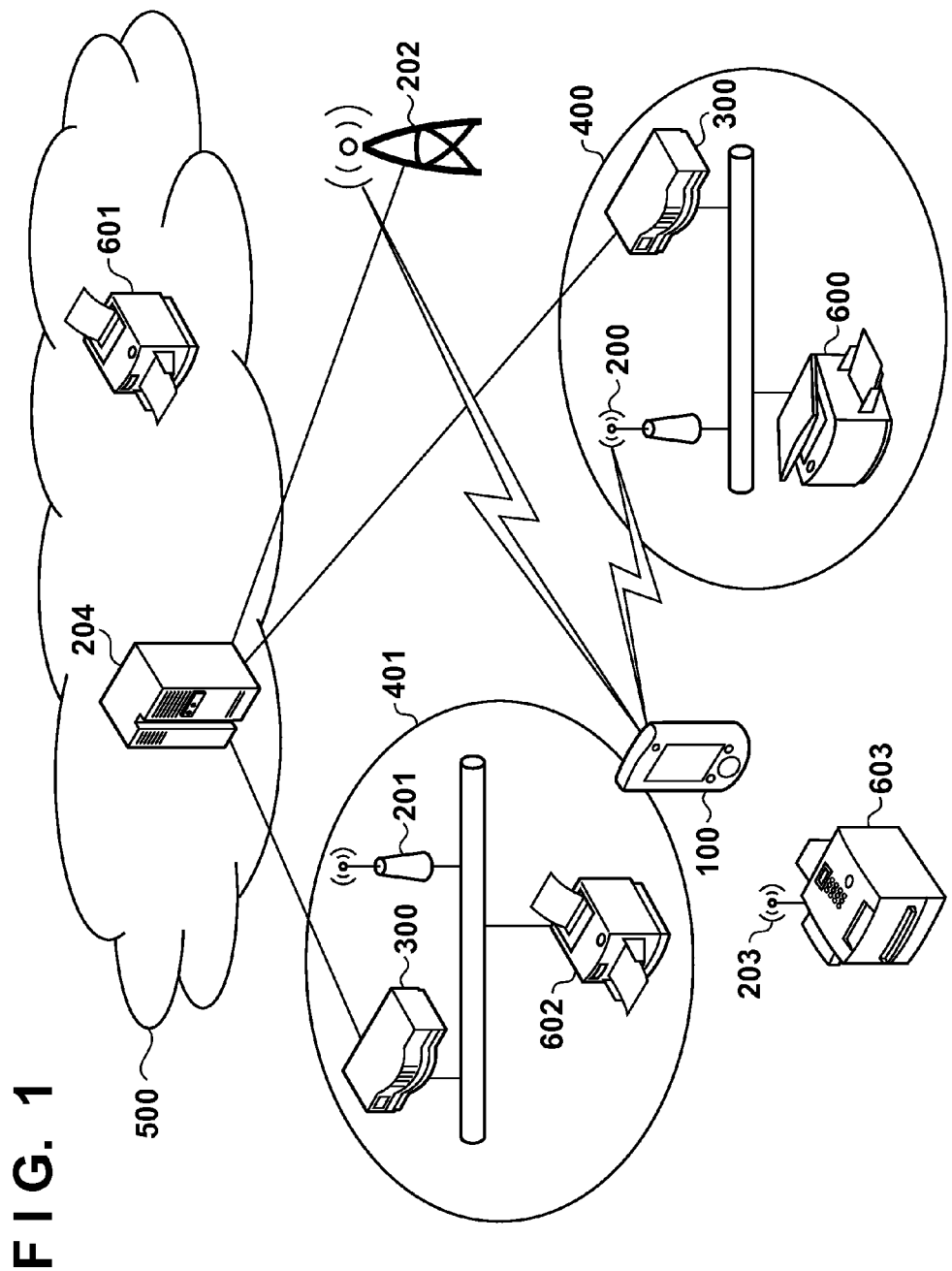
FIG. 1 is a view showing an example of a network configuration.
Figure 4:
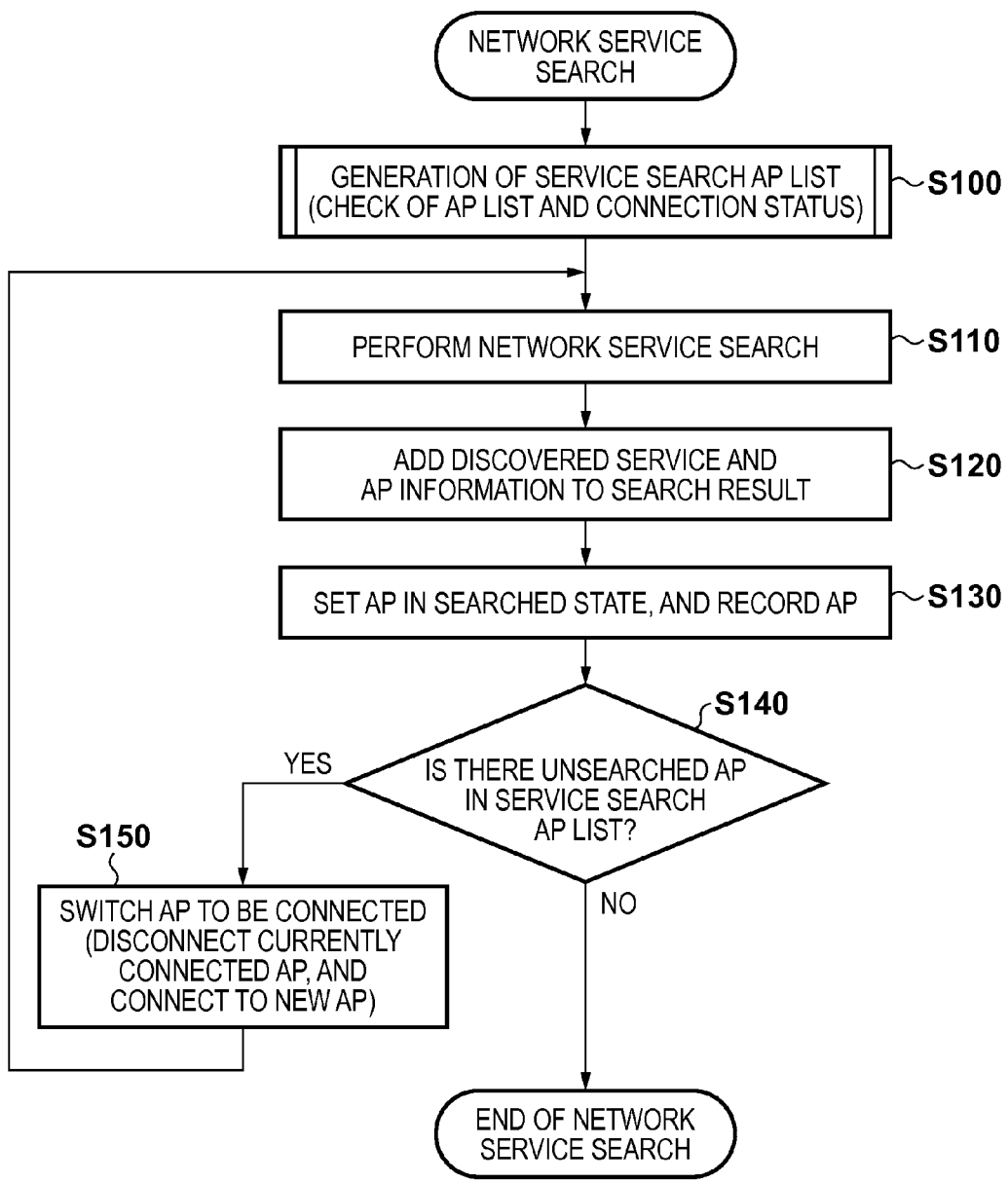
FIG. 4 is a flowchart illustrating a service search.

The first embodiment in which the mobile terminal 100 searches for services on a network will be described with reference to FIGS. 1 and 4. FIG. 1 is a view showing an example of a network configuration according to the embodiment. The mobile terminal 100 includes authentication information for using a "WiFi AP1" 200 serving as a WiFi access point for connecting to a network 400. A printer 603 can perform WiFi Direct communication, and includes a "WiFi AP2" 203 as an access point. The "WiFi AP2" 203 has been set so that authentication information is not necessary for wireless LAN connection. On the other hand, connection to a "WiFi AP3" 201 serving as a WiFi access point for connecting to a network 401 requires authentication information. Assume, however, that the mobile terminal 100 does not hold the authentication information.

The mobile base station 202 is the base station of a mobile network. By connecting to the mobile base station 202 via the 3G/4G network, the mobile terminal 100 can connect to the Internet 500.

Although the network 400 or 401 is connected with the Internet 500 via a router 300, the router 300 has been set not to allow multicast communication. That is, if the mobile terminal 100 connects to an arbitrary network, it is impossible to search for a network service provided by a network other than the connected one using a service search protocol.

Each of print apparatuses 600 to 603 receives a job or the like via the network, and provides a print service for executing print processing. The print apparatus may be a printer for providing only a print function, an MFP (Multi-Function Peripheral) for providing other functions (services), or the like.

(Network Service Search Processing)

A processing procedure of searching for a print service when the CPU 101 executes the service search system 125 of the mobile terminal 100 in such an environment will be described with reference to FIGS. 4 and 8A to 8C. The print service indicates the print function provided by the print apparatus. In this embodiment, the print service will be explained as an example of a network service to be searched for.

The tables of various data to be used in the processing procedure will be explained first with reference to FIGS. 8A to 8C. FIG. 8A is a table showing an example of the structure of an AP management table 801. Information about each AP is registered in the table.

FIG. 8B shows an example of the structure of a service search AP list 802. The service search AP list 802 is a list for managing information of an AP to be searched for and a search status in association with each other. All the search statuses indicate an unsearched state in generating a service search AP list.

FIG. 8C shows an example of the structure of a service search result list 803. Information of a network service obtained as a result of a service search and information of an AP connected when searching for the service are registered together in the service search result list 803. By assuming that a print service is searched for, the service search result list 803 according to the embodiment includes, as network service information, the AP information as well as a printer name, an IP address, and GeoLocation (latitude/longitude). For example, if Printer A and Printer B are discovered by connecting to WiFi AP1 to search for a service, information of WiFi AP1 is registered as AP information in association with each of information of Printer A and that of Printer B.

Note that the pieces of information constituting the lists and table are merely examples, and other pieces of information may be managed in association with each other.

Processing of searching for a network service will be described with reference to FIG. 4. The processing shown in FIG. 4 starts when, for example, an instruction to search for a printer on a network is accepted from the user. Note that the search processing may be periodically executed.

To perform a service search, the mobile terminal 100 determines the AP of a network to be searched for by referring to the AP management table 801, and generates a service search AP list 802 (step S100). Details of the processing in step S100 will be described later with reference to FIG. 5.

After generating the service search AP list 802, the mobile terminal 100 performs the designated network service search in a currently connected network environment (step S110). The network service search indicates a search using a network service search technique such as mDNS, WS-Discovery, or SLP, and obtaining of information.

If the mobile terminal 100 detects a service, it adds information of the AP connected in the search to the service search result list 803 together with information about the detected service (step S120). Upon completion of the network service search, the mobile terminal 100 sets the searched AP in a searched state, and records it in the service search AP list 802 (step S130).

Upon completion of the network service search for the currently connected AP, the mobile terminal 100 checks the service search AP list 802, and determines whether the network service search has been performed for all registered APs (step S140). If there is an unsearched AP in the service search AP list 802 (YES in step S140), the mobile terminal 100 disconnects connection with the currently connected AP, and newly connects to an unsearched AP (step S150).

After that, the mobile terminal 100 returns the process to step S110, and continues the network service search processing for the unsearched AP. If there is no unsearched AP in the service search AP list 802 (NO in step S140), the service search has been performed for all the APs, and thus the mobile terminal 100 terminates the network service search processing.

Figure 10:
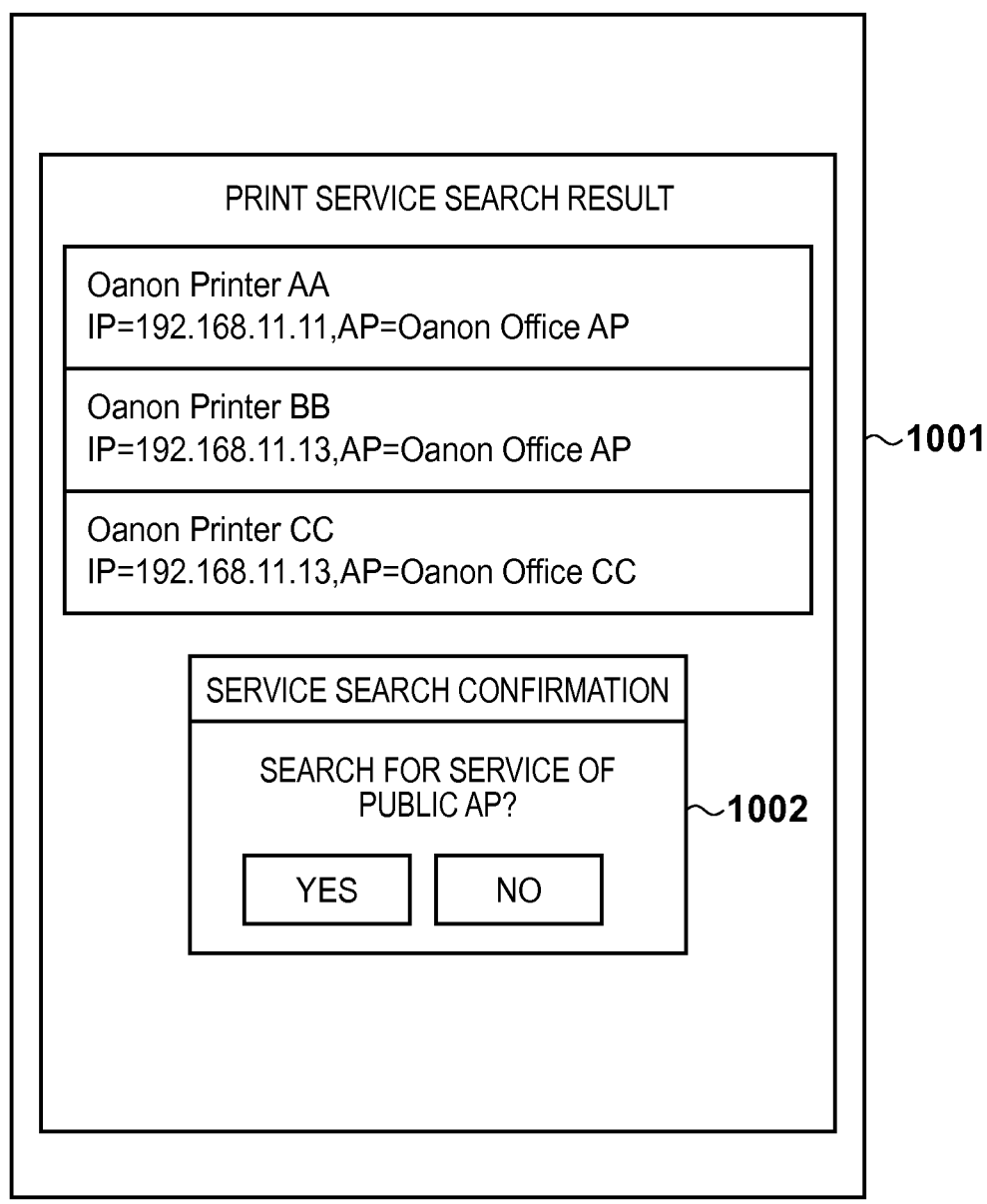
FIG. 10 is a view showing an example of a service search result screen.

Upon completion of the processing procedure, the mobile terminal 100 displays a print service search result screen 1001 shown in FIG. 10 as a list (selection screen) of print apparatuses (print services) usable by the user as a result of the network service search. In this example, the print service search result screen 1001 is a printer selection screen since a printer is searched for.

(Service Search AP List Generation Processing)

Figure 5:
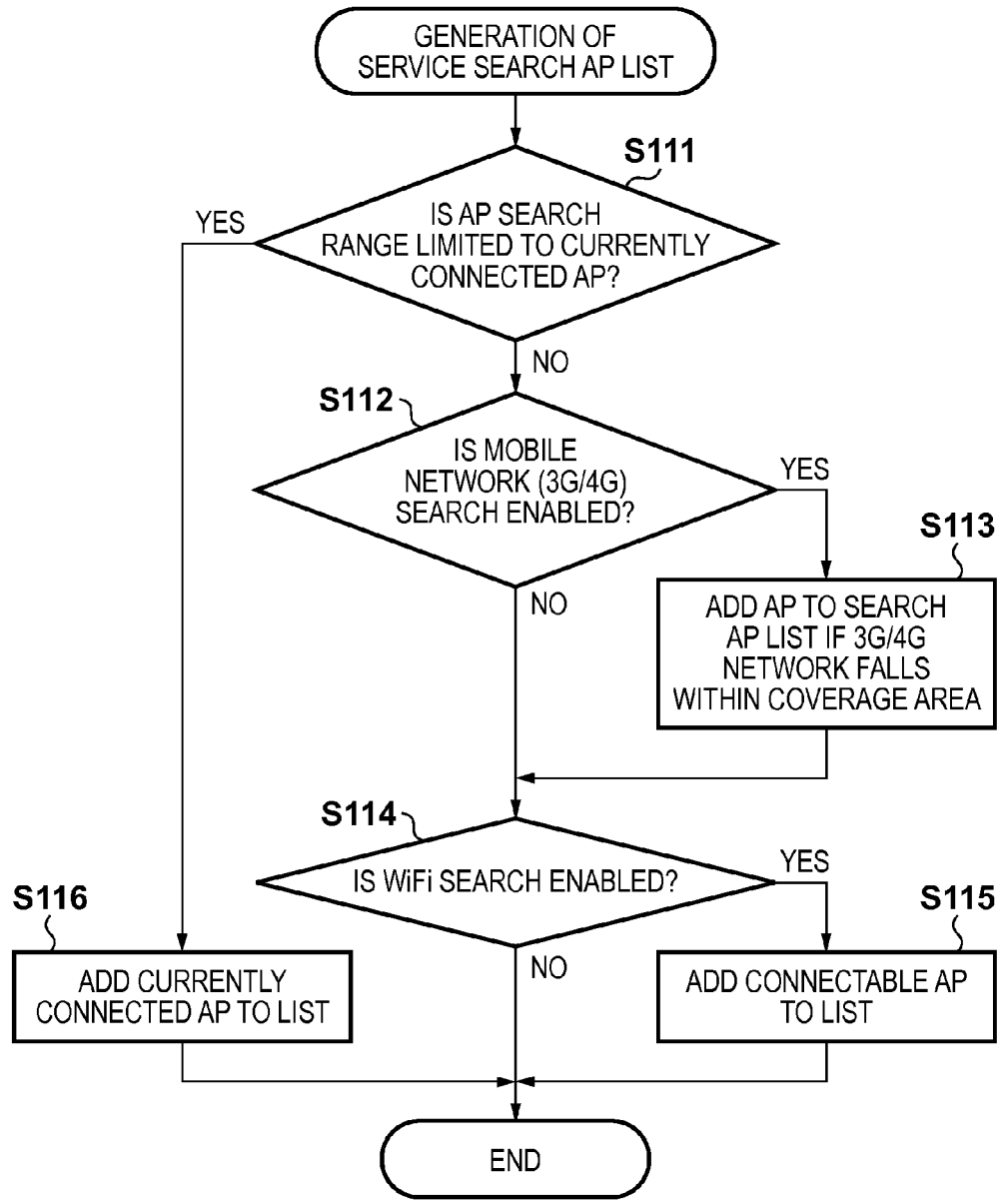
FIG. 5 is a flowchart illustrating service search AP list generation processing.

The processing procedure of generating the service search AP list 802 in step S100 of FIG. 4 will be described with reference to FIGS. 5 and 9. The processing procedure is implemented when the CPU 101 executes the service search system 125 of the mobile terminal 100.

Figure 9:
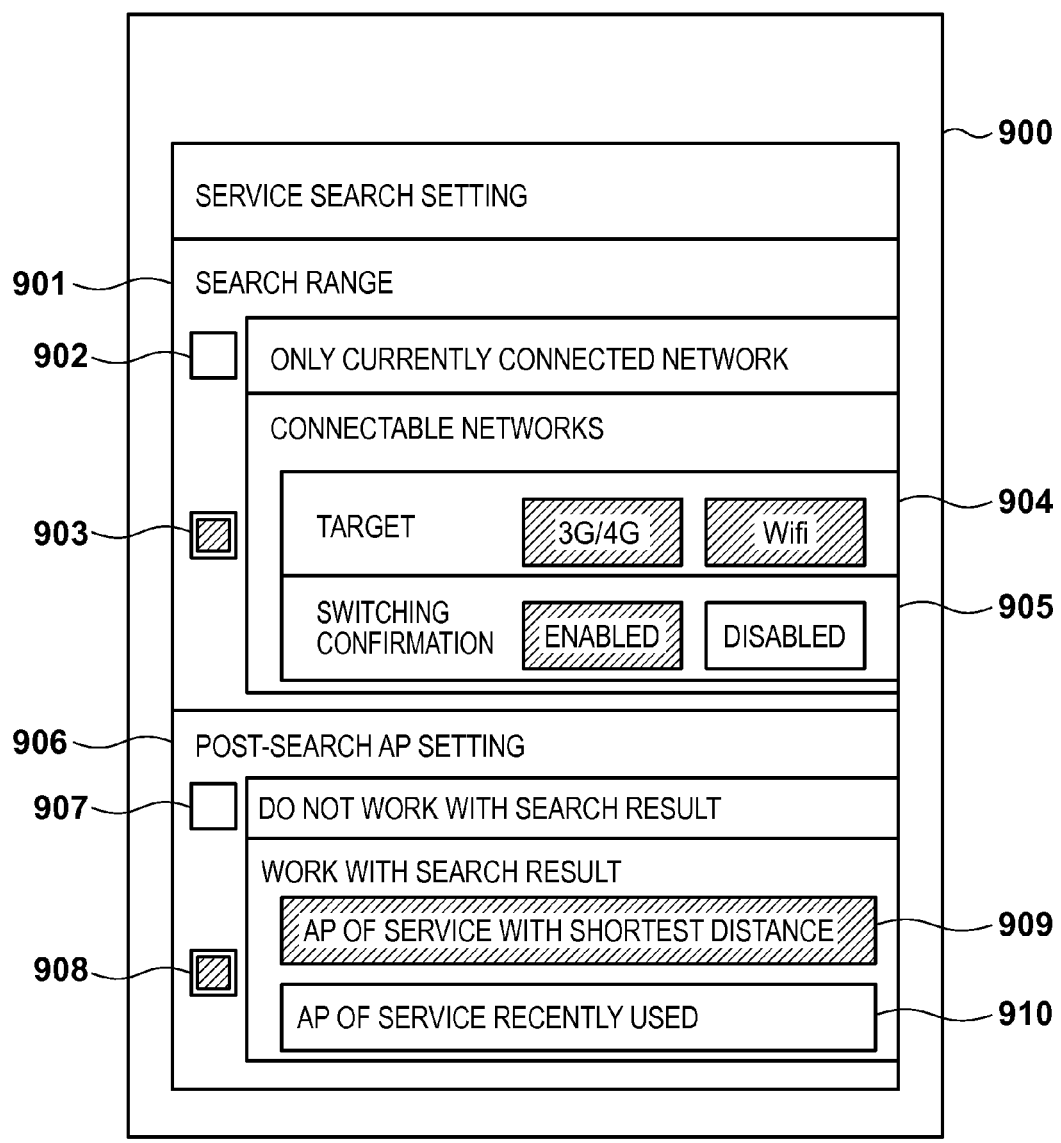
FIG. 9 is a view showing an example of a service search setting screen.

FIG. 9 shows a setting screen 900 for setting a service search range. The setting screen 900 includes a setting item 901 for designating the service search range and a setting item 906 for designating settings associated with post-search AP settings.

It is possible to set, in the setting item 901, whether to search only a currently connected network or all connectable networks (APs) when the mobile terminal 100 searches for a network service on a network (controllers 902 and 903). A setting button 904 is provided for selecting whether to include a mobile network (3G/4G) and WiFi as targets if all the connectable networks are to be searched. Note that a selectable connection method is not limited to this, and a network supporting another connection method may be selectable. Furthermore, a setting button 905 associated with network switching in a search is also provided. If switching confirmation is set to "enabled", it is possible to prompt the user to decide whether to perform AP switching, when changing the AP during the network service search processing.

If, for example, the network switching setting is "enabled", a confirmation screen 1002 is displayed every time the AP is switched in a network service search, as shown in the print service search result screen 1001 of FIG. 10. This prompts the user to decide whether to continue the network service search. Note that the print service search result screen 1001 of FIG. 10 is displayed based on contents of the service search AP list 802. The print service search result screen 1001 may be displayed by, for example, calculating the distance of a print service (print apparatus) based on the position information of the print service and that of the mobile terminal 100, and sorting the print services in ascending order of the distances. Alternatively, the user may set a display order in advance, or sort the data depending on the purpose.

Upon start of the processing of generating the service search AP list 802, the mobile terminal 100 checks the setting values set in itself, and determines a search range (step S111). If the search range is limited to the currently connected network (YES in step S111), the mobile terminal 100 includes only the currently connected AP in the service search AP list 802 (step S116). The processing procedure is then terminated.

If the search range is set to include the connectable networks (NO in step S111), the mobile terminal 100 checks whether the mobile network (3G/4G) is enabled as a search target (step S112). If the mobile network is enabled (YES in step S112), the mobile terminal 100 checks the communication status of the mobile network. If the communication status indicates a connectable status (within the communication range), the mobile terminal 100 adds, to the service search AP list 802, an AP corresponding to the network (step S113). On the other hand, if the mobile network is disabled (NO in step S112), the process advances to step S114.

The mobile terminal 100 checks whether the WiFi network is enabled as a service search target (step S114). If the WiFi network is enabled (YES in step S114), the mobile terminal 100 checks the status/settings of the AP of the WiFi network. If a connectable status is indicated, the mobile terminal 100 adds the AP to the service search AP list 802 (step S115). Examples of the AP included in the service search AP list 802 are an AP for which the reception indicates that the AP is within the communication range and authentication is not necessary for connection, and an AP for which authentication is necessary for connection and authentication information has been registered in the mobile terminal 100. For the AP management table 801 shown in FIG. 8A, for example, WiFi AP1 and WiFi AP2 correspond to the examples.

(Network Service Use Processing)

Figure 6:
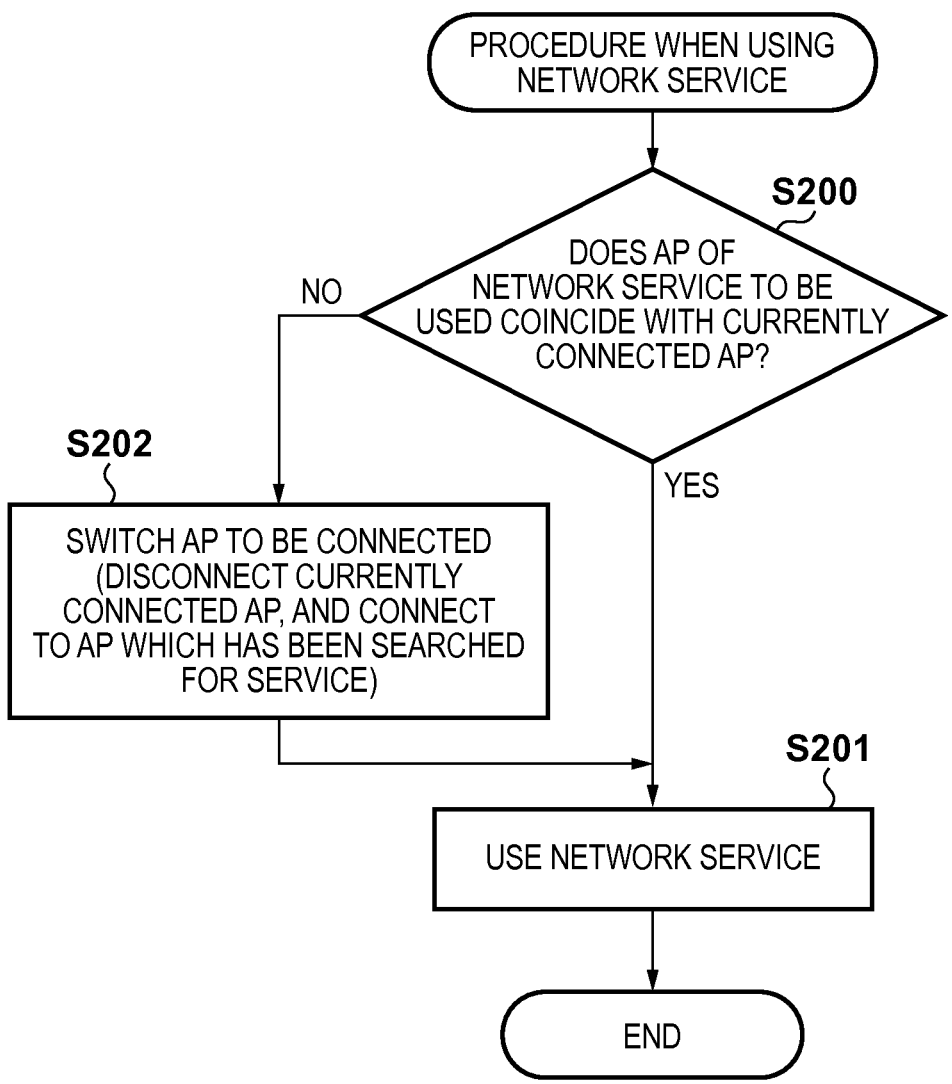
FIG. 6 is a flowchart when using a network service.

The procedure of network service use processing will be described with reference to FIG. 6. This processing procedure is implemented when the CPU 101 executes the service search system 125 of the mobile terminal 100. The processing procedure starts when, for example, the user designates a service (print apparatus) to be used from the list displayed on the print service search result screen 1001 of FIG. 10.

The mobile terminal 100 selects a service to be used from the service search result list 803, and compares the AP information of the service recorded in the service search result list 803 with information of a currently connected AP to determine whether the APs coincide with each other (step S200). If the APs coincide with each other (YES in step S200), the mobile terminal 100 is currently connected to a network environment (AP) communicable with the service, and thus communicates with the service without switching the AP, thereby using the selected service (step S201).

On the other hand, if the APs are different from each other (NO in step S200), the mobile terminal 100 disconnects connection with the currently connected AP, and switches to connection with the AP to which the service to be used belongs (step S202). After that, the mobile terminal 100 communicates with the service to be used, thereby using the service (step S201).

If the currently connected AP is different from the AP when searching for a service, it is highly probable that it is impossible to communicate with the discovered service from the network of the currently connected AP, and thus connection is switched. For example, assume a case in which Printer C of the service search result list 803 is used while the mobile terminal 100 is connected to WiFi AP1. In this case, if the mobile terminal 100 attempts to communicate with Printer C while connecting to WiFi AP1, it undesirably communicates with Printer A operated by WiFi AP1 with the same IP address as that of Printer C. To prevent this problem, it is necessary to switch the AP when the AP of the service to be used is different.

(AP Switching Processing)

Figure 7:
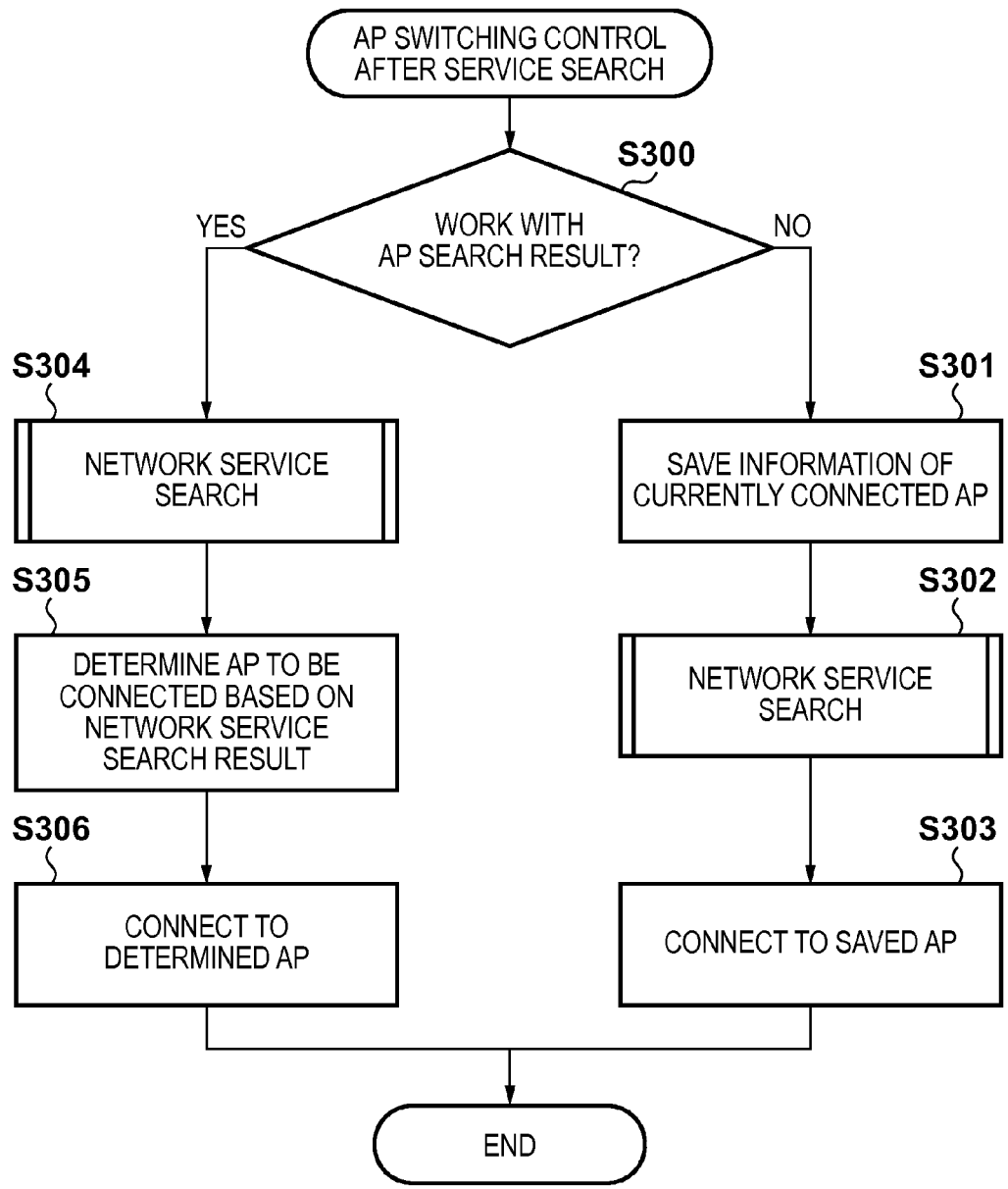
FIG. 7 is a flowchart illustrating processing of switching a connected AP after a service search.

Processing for improving the usability from a network service search to service use processing will be described with reference to FIG. 7. More specifically, the processing is performed to decide an AP to which the mobile terminal 100 is connected (switched) after a network service search. This enables to use the service by switching, after searching for the service by connecting a plurality of APs, between a state in which the mobile terminal 100 is connected to the AP of the service to be actually used and a state before the search. This processing procedure is implemented when the CPU 101 executes the service search system 125 of the mobile terminal 100.

Before performing a network service search, the mobile terminal 100 checks a setting of AP switching after a service search to determine whether to work switching processing with a search result (step S300). The setting of AP switching after a service search corresponds to, for example, the setting item 906 set in the setting screen 900 of FIG. 9. The setting item 906 is a setting for the user to select an AP to be connected after a network service search. If the user wants to connect, after a network service search, to an AP before the service search, he/she selects a setting 907 not to work with a search result. On the other hand, if the user wants to connect to the AP of a service which is probably used by working with a search result after a network service search, he/she selects a setting 908 to work with a search result.

When the setting to work with a search result is selected, two settings as shown in FIG. 9 are available in this embodiment. The first one is a setting 909 to connect to the AP of a service with a shortest distance. The second one is a setting 910 to connect to the AP of a service recently used. Assume that the user enables one of the settings. In this case, after a network service search, the mobile terminal 100 connects to the AP of a service, of the service search result list 803, which satisfies the condition. This can decrease the frequency at which connection switching occurs to use a discovered service after a network service search, thereby shortening a processing standby time when the user uses a service.

If a post-search AP setting after a service search indicates a setting not to work with a search result, the mobile terminal 100 needs to return, after a service search, to an AP before the service search. If the setting not to work with a search result is selected (NO in step S300), the mobile terminal 100 temporarily saves information of an AP connected before the service search (step S301). The mobile terminal 100 performs a network service search on a designated network (step S302). The processing in step S302 corresponds to that shown in FIG. 4. Upon completion of the service search, the mobile terminal 100 connects to the AP before the search saved in step S301 (step S303). The processing procedure is then terminated.

If the post-search AP setting after the service search indicates a setting to work with a search result (YES in step S300), the mobile terminal 100 searches for a service on a designated network (step S304). This processing corresponds to that shown in FIG. 4. Based on service information as a result of the service search, the mobile terminal 100 determines an AP to be connected (step S305). If the mobile terminal 100 determines an AP to be connected, it connects to the AP (step S306). The processing procedure is then terminated.

[Processing Using Service Search History]

The processing when searching for a service to be used by performing a network service search has been explained above. The present invention, however, is applicable to a case in which service search history information is used. The service search history information will be described with reference to FIG. 11.

Service history information 1101 shown in FIG. 11 is acquired from history information of a service used by the service search system 125 of the mobile terminal 100 and stored in a storage area (the HD 112 or SD 113) usable by the mobile terminal 100.

As the service history information 1101, a last use date/time is recorded together with a service name, AP information in connection, and an IP address. Since it is highly probable that the user uses again a service which was used once, he/she can select a service to be used from the service history information, and use it without performing a service search. A procedure when using a network service in this case is the same as that shown in FIG. 6.

According to the present invention, as described above, it is possible to reliably discover a desired service by performing a service search for each connectable network when a mobile terminal connectable to a plurality of networks searches for a service on a network.

Note that a print service has been exemplified as a network service in this embodiment. A service providing apparatus for providing another service may be searched. For example, a Fax service or the like is available.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-147598, filed Jun. 29, 2012, which is hereby incorporated by reference herein in its entirety.

What is claimed is:

1. A communication apparatus that searches a service providing apparatus, comprising:
   a display unit configured to display a search result of the service providing apparatus;
   one or more processors; and
   at least one memory coupled to the one or more processors, the at least one memory having instructions stored thereon which, when executed by the one or more processors, cause the communication apparatus to:
   if a search instruction for searching the service providing apparatus is received from a user, connect a plurality of access points to the communication apparatus in order and search the service providing apparatus via each of the plurality of access points; and
   if the search of the service providing apparatus via each of the plurality of access points is completed and an access point to which the communication apparatus is connected does not coincide with an access point to which the communication apparatus was previously connected before the search of the service providing apparatus was performed, a connection destination is returned to the access point to which the communication apparatus was previously connected before the search of the service providing apparatus was performed.

2. The communication apparatus according to claim 1, wherein
   the plurality of access points includes at least a first access point and a second access point, and
   the instructions, when executed by the one or more processors, further cause the communication apparatus to:
      connect the first access point and search the service providing apparatus via the first access point, and
      if a search of the service providing apparatus via the first access point is completed, switch an access point as a connection destination from the first access point to the second access point, and search the service providing apparatus via the second access point.

3. The communication apparatus according to claim 1, wherein the instructions, when executed by the one or more processors, further cause the communication apparatus to manage the searched service providing apparatus in relation to an access point which has been connected when searching the service providing apparatus, and
   wherein if a user selects a service providing apparatus from the search result, the communication apparatus connects an access point corresponding to the service providing apparatus selected by the user.

4. The communication apparatus according to claim 3, wherein the instructions, when executed by the one or more processors, further cause the communication apparatus to determine whether or not an access point to which the communication apparatus is connecting matches an access point corresponding to the service providing apparatus selected by the user, and
   wherein if a determination is made that the access point to which the communication apparatus is connecting does not match the access point corresponding to the service providing apparatus selected by the user, the communication apparatus disconnects a wireless connection to the access point to which the communication apparatus is connecting, and connects the access point corresponding to the service providing apparatus selected by the user.

5. The communication apparatus according to claim 1, wherein the instructions, when executed by the one or more processors, further cause the communication apparatus to:
   generate an access point list indicating a plurality of access points,
   connect a plurality of access points based on the access point list, and
   search a service providing apparatus via each of the plurality of access points.

6. The communication apparatus according to claim 5, wherein if the search instruction is received from the user, the access point list is generated by searching surrounding access points.

7. The communication apparatus according to claim 1, wherein the communication apparatus is a mobile terminal.

8. The communication apparatus according to claim 1, wherein a service providing apparatus which is searched is a printing apparatus.

9. A method for controlling a communication apparatus that searches a service providing apparatus, comprising:
   if a search instruction for searching a service providing apparatus is received from a user, connecting a plurality of access points to the communication apparatus in order and searching the service providing apparatus via each of the plurality of access points;
   displaying a search result of the service providing apparatus in the searching; and
   if the search of the service providing apparatus via each of the plurality of access points is completed and an access point to which the communication apparatus is connected does not coincide with an access point to which the communication apparatus was previously connected before the search of the service providing apparatus was performed, returning a connection destination to the access point to which the communication apparatus was previously connected before the search of the service providing apparatus was performed.

10. The method according to claim 9, wherein
    the plurality of access points include at least a first access point and a second access point, in the searching, the first access point is connected and the service providing apparatus is searched via the first access point, and if a search of the service providing apparatus via the first access point is completed, in the searching, an access point as a connection destination is switched from the first access point to the second access point, and the service providing apparatus is searched via the second access point.

11. The method according to claim 9, further comprising:

managing the service providing apparatus searched in the searching in relation to an access point which has been connected when searching the service providing apparatus, wherein if a user selects a service providing apparatus from the search result, the communication apparatus connects an access point corresponding to the service providing apparatus selected by the user.

12. The method according to claim 11, further comprising:

determining whether or not an access point to which the communication apparatus is connecting matches an access point corresponding to the service providing apparatus selected by the user, wherein if it is determined in the determining that the access point to which the communication apparatus is connecting does not match the access point corresponding to the service providing apparatus selected by the user, the communication apparatus disconnects a wireless connection to the access point to which the communication apparatus is connecting, and connects the access point corresponding to the service providing apparatus selected by the user.

13. The method according to claim 9, further comprising:

generating an access point list indicating a plurality of access points, wherein in the searching, a plurality of access points are connected based on the access point list, and a service providing apparatus is searched via each of the plurality of access points.

14. The method according to claim 13, wherein if the search instruction is received from the user, in the generating, the access point list is generated by searching surrounding access points.

15. The method according to claim 9, wherein the communication apparatus is a mobile terminal.

16. The method according to claim 9, wherein a service providing apparatus which is searched in the searching is a printing apparatus.

* * * * *